(12) United States Patent
Wan et al.

(10) Patent No.: US 7,739,612 B2
(45) Date of Patent: Jun. 15, 2010

(54) BLENDED EDITING OF LITERAL AND NON-LITERAL VALUES

(75) Inventors: Samuel S. Wan, Seattle, WA (US); Henry A. Sowizral, Redmond, WA (US); Kenneth L. Young, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 11/224,915

(22) Filed: Sep. 12, 2005

(65) Prior Publication Data

US 2007/0078735 A1     Apr. 5, 2007

(51) Int. Cl.
*G06F 3/048* (2006.01)
(52) U.S. Cl. ............... 715/763; 715/762; 715/801; 715/967
(58) Field of Classification Search ......... 715/526–529, 715/762–765, 806, 853–854, 966–967, 801, 715/781; 707/102, 103 R
See application file for complete search history.

(56) References Cited

U.S. PATENT DOCUMENTS

| | | | | |
|---|---|---|---|---|
| 5,487,141 A | * | 1/1996 | Cain et al. | 715/764 |
| 5,544,288 A | * | 8/1996 | Morgan et al. | 715/801 |
| 5,555,365 A | * | 9/1996 | Selby et al. | 715/765 |
| 5,673,401 A | * | 9/1997 | Volk et al. | 725/139 |
| 6,104,393 A | * | 8/2000 | Santos-Gomez | 715/763 |
| 6,215,488 B1 | | 4/2001 | Bloem et al. | |
| 6,262,729 B1 | * | 7/2001 | Marcos et al. | 715/744 |
| 6,262,734 B1 | | 7/2001 | Ishikawa | |
| 6,330,007 B1 | | 12/2001 | Israel et al. | |
| 6,633,888 B1 | * | 10/2003 | Kobayashi | 707/103 R |
| 6,700,591 B1 | * | 3/2004 | Sharpe | 715/762 |
| 6,993,475 B1 | | 1/2006 | McConnell et al. | |
| 6,996,800 B2 | | 2/2006 | Lucassen et al. | |
| 6,999,963 B1 | | 2/2006 | McConnell et al. | |
| 7,194,680 B1 | * | 3/2007 | Roy et al. | 715/513 |

(Continued)

FOREIGN PATENT DOCUMENTS

WO  DE-WO2005059743     2/2006

OTHER PUBLICATIONS

BMH Associates, Inc. "Simulation, Training, and Game Editor {STAGE} Graphical User Interface", *Version* 1.1, *BMH Associates, Inc.* Version 1.1, BMH Associates, Inc. Aug. 29, 2005 , pp. 1-15.

(Continued)

*Primary Examiner*—William L Bashore
*Assistant Examiner*—Andrew Tank

(57) ABSTRACT

An editing application may allow a user to change a literal property value of an object in a conventional manner. The functionality of the editing application may be expanded to allow a user to access non-literal values for property values, by allowing the user to define a calculation based on one or more sources. To indicate that an associated property value of an object is a non-literal value, a non-literal cue may be presented to the user, such as through the display of the object, the associated property indicator, and/or the associated property value. To reduce the learning curve of the expanded functionality, the user interface for literal values of a property may remain minimally impacted, while, alternative gestures associated with the object, property indicator, and/or property value may be used to allow access to the non-literal value controls or information.

18 Claims, 14 Drawing Sheets

U.S. PATENT DOCUMENTS

| | | |
|---|---|---|
| 2002/0124115 A1 | 9/2002 | McLean et al. |
| 2003/0001904 A1 | 1/2003 | Rosen et al. |
| 2006/0117265 A1 | 6/2006 | Omi et al. |
| 2007/0078735 A1 | 4/2007 | Wan et al. |

OTHER PUBLICATIONS

Mathworks, , "Creating Graphical User Interfaces Previous Page Next Page Guide: A Brief Introduction", http://www.mathworks.com/access/helpdesk/help/techdoc/creating_guis/f3-998349.html , p. 1.

* cited by examiner

BLENDED EDITING OF LITERAL AND NON-LITERAL VALUES

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Editing of property value of displayed objects may be provided by an editing application such as an application generation application, a text editing application, a spreadsheet application, a presentation application, a graphics editing application, or any other editing application. The editing application may allow a user to change a literal property value of an object in a conventional manner, which may be expanded to allow modification of a property to a non-literal value. A non-literal value is a value computed from one or more sources. To indicate that an associated property value of an object is a non-literal value, a non-literal cue may be presented to the user, such as through the display of the object, the associated property indicator, and/or the associated property value. To reduce the learning curve of expanded functionality in property value edits, the user interface for literal values of a property may remain unchanged or minimally impacted. However, alternative gestures associated with the object, property indicator, and/or property value may be used to allow the user to access the non-literal value controls or information indicated by a non-literal cue.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a user interface editing application, the user interface editing application described is provided as an example and not a limitation and it is to be appreciated that any editing application may provide any number and/or combination of the features described further below. As those skilled in the art will appreciate, the present examples are suitable for a variety of applications, such as forms creation applications, word processing applications, spreadsheet applications, and the like. For example, a text editing application such as WORD® available from Microsoft Corp. of Redmond, Wash., a spreadsheet application such as EXCEL® available from Microsoft Corp. of Redmond, Wash., a presentation application such as POWERPOINT® available from Microsoft Corp. of Redmond, Wash., a graphics editing application such as VISIO® available from Microsoft Corp. of Redmond, Wash., or any other application which allows a user to change a literal property value and which may be expanded to allow modification of a property with a non-literal value.

Objects created with an editing application can take many forms: displayed graphics, text, drawings, spreadsheets, user interface items such as edit boxes, list boxes, scroll bars, pick lists, pushbuttons, radio buttons and the like. Although the individual elements of an object (e.g., radio button) may appear to the user as a single composite item, it may actually be represented in the computer as a number of separate items or sub-elements that have been combined together. Furthermore, each of these sub-elements themselves can be composed from other sub-elements. In this manner, objects can serve as building blocks for building other, more complex, objects. Such an approach may be useful because the software managing the object (e.g., the editing application) can re-use the definitions of certain common elements and their properties when assembling them into composite elements.

Example Operating Environment

Figure 1:
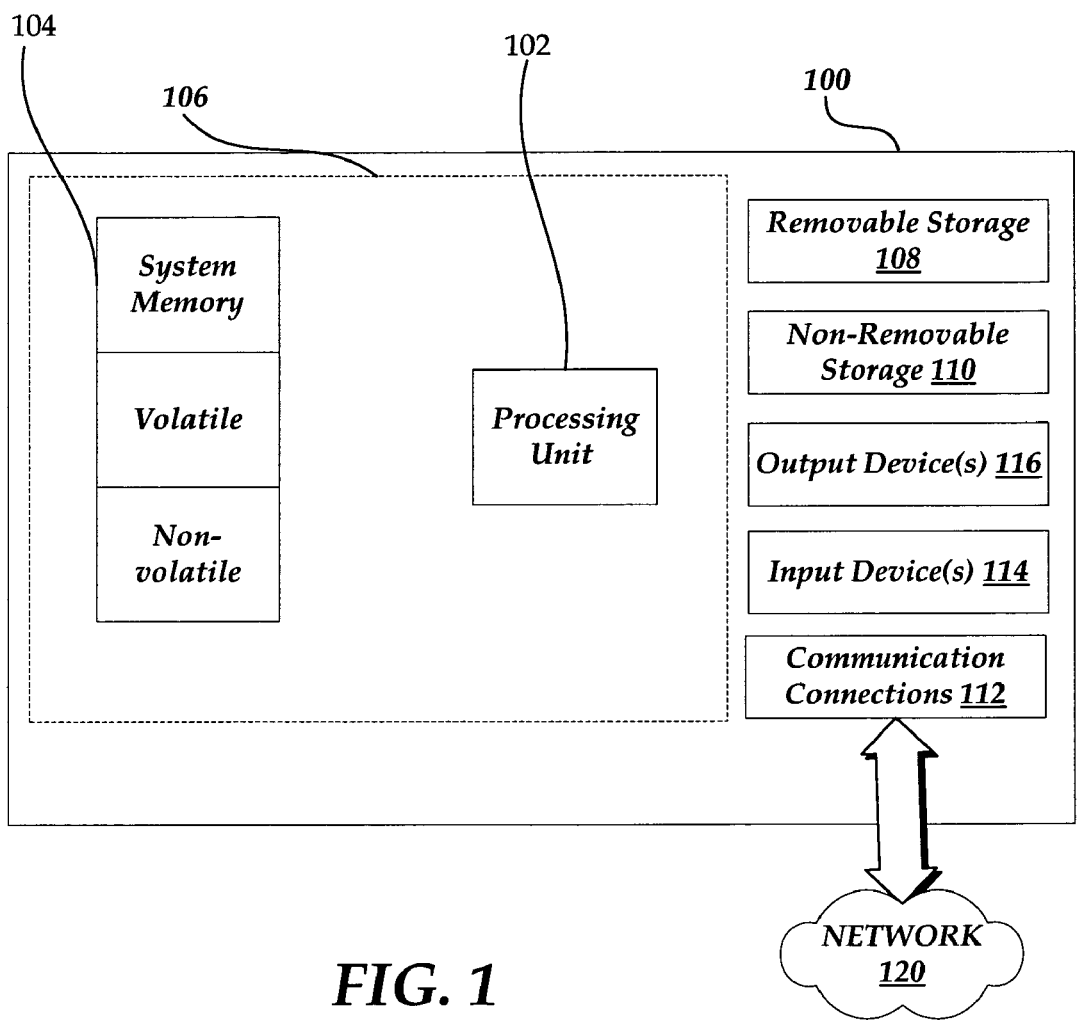
FIG. 1 illustrates an example computing device suitable for implementing an editing application.

FIG. 1 and the following discussion are intended to provide a brief, general description of a suitable computing environment in which an editing application may be implemented to segment the foreground regions of the image from the background regions. The operating environment of FIG. 1 is only one example of a suitable operating environment and is not intended to suggest any limitation as to the scope of use or functionality of the operating environment. Other well known computing systems, environments, and/or configurations that may be suitable for use with a user interface editing application described herein include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, the editing application will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for implementing an editing application includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 112 that allow the device 100 to communicate with other devices, such as with other computing devices through network 120. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 100 may also have input device(s) 114 such as keyboard, mouse, pen, voice input device, touch input device, laser range finder, infra-red cameras, video input devices, and/or any other input device. Output device(s) 116 such as one or more displays, speakers, printers, and/or any other output device may also be included.

Those skilled in the art will realize that storage devices utilized to store program instructions can be distributed across a network. For example a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Editing Application Having Literal and Non-Literal Values

A user interface editing application may be used by developers to generate user interfaces for applications, for example, to create the function and display of controls and other features to a user of the generated application. The user interface editing application may be independent or combined with an application development tool, such as VISUAL STUDIO available from the Microsoft Corporation of Redmond, Wash. To generate the display of controls, objects, and other features of the application, a developer may select objects to be displayed and set one or more properties of those objects within the user interface editing application. The object may be generated and/or modified using templates, tools, palettes, and the like.

For example, to create a button control in an application, a developer may select a standard button template. The display of the button may then be modified from the default selections by changing one or more properties of the button. The one or more properties of the button, or any other object to be displayed by the application being generated, may be edited within a programming language or the user interface editing application may present one or more editor controls which allow the developer to modify one or more properties of the object. In this manner, when a developer sees a property editor control, e.g., a color palette, text box, drop down menu, and the like, the developer may assume that the property editor control may be used to modify the property of the object. For example, the height, width, border width, border color, border color, fill texture, fill color, text box, and other properties of the button may be modified by setting the value of property to a literal value. For example, the width of the button may be set to a literal value of 2 inches. The literal value of the property may be changed in any suitable manner. For example, the user interface editing application may present one or more options, such as in a drop down box, of possible button widths, and the developer may scroll down the presented list to select the literal value for the width property. In another example, a text box may be presented to the developer to type in the desired literal value of the button width property. In yet another example, the developer may manipulate the width of the displayed button by selecting and moving or dragging an adorner (e.g., a displayed node of a border of the button object) to the desired width. The literal value of the newly displayed button may be determined by the user interface editing application and set to the literal value of the width property. Any combination of these and other suitable tools or methods may be used to conventionally edit the literal values of a displayed object to generate displayed features of an application.

The literal values of the properties of displayed objects may be any suitable value which may be a real number, a string, integer, and the like. For example, a literal value is any value that is not the result of a computation or expression, such typing "3", "Sep. 12, 2005", "help", and the like. In this manner, a literal value does not depend on its surrounding environment or other sources, other than the data store storing the literal value. The literal value of a property may be stored in any suitable manner, such as the value of an internal variable or in a property value data store and may be associated with a property identifier associated with the particular object. In this manner, a conventional user interface editing application may present one or more property identifier and property value pairs, where the property identifier may be used to retrieve the desired property and literal value when an object is displayed. A literal value may be simple, e.g., a single value, or may be compound, e.g., the literal value is an object comprising one or more simple literal values such as a gradient fill with gradient start and stop points, colors, and the like.

In some cases, the desired value of a property of an object may not be a value which may be selected from an array of predetermined values or may not be static depending on the status or features of other properties of the object or one or more other objects. One example of this is a non-literal value of property which is computed from one or more sources. A non-literal value may be computed in any suitable manner. One example of a non-literal property value in a word processing application may be an automatically determined display of a page number or current date. On example of a non-literal property value in a spreadsheet application may be a statement that the current cell should display a sum or cell A12 and cell B14. Other non-literal property values are discussed further in U.S. patent application Ser. No. 10/939,881 filed Sep. 13, 2004, titled DATA BINDING; Ser. No. 10/187,012, filed Jun. 28, 2002, titled SYSTEM AND METHOD FOR ASSOCIATING PROPERTIES WITH OBJECTS; Ser. No. 10/186,985, filed Jun. 28, 2002, titled EXTENSIBLE ON-DEMAND PROPERTY SYSTEM; and Ser. No. 10/692,924, filed Oct. 23, 2003, titled METHODS FOR APPLYING STYLES TO VISUAL ASPECTS OF USER INTERFACE ELEMENTS, which are all incorporated herein by reference.

In one example, a non-literal value of an object property may be computed using a binding. The binding may bind the property value to another object property such as a property value of the same or other object, an indicated value stored in a data store, and the like. In one example, the width of the button may be bound to the value of another property, such as the width of another button. In this manner, the width of the button is determined by the width of another button. However, it is to be appreciated that the property types of bound properties do not need to be identical. For example, the width of the button may be bound to any property value of another object, such as the height of a text box object, the font size of text, the fill color of the button or another object, and the like. It is to be appreciated that the values of the bound properties do not have to be of the same type or scale, e.g., both real numbers, both strings, and the like. The developer and/or the editing application may provide a suitable conversion from one value to another when properties are bound which may be a portion of the calculation of the non-literal value of the object property. Bindings of properties may be uni-directional, i.e., one property is dependent on the property value(s) of one or more 'parent' properties or bi-directional. However, many bindings may be represented as uni-directional in a development environment. A binding of a value of a property to any other property may be set or indicated in any suitable manner and using any suitable protocol. In one example, a value of a text property may be bound using a statement of Text="{BindingPath=BookTitle}" where BookTitle is a text value of another object resource. The binding of the property value may be edited by changing the resource to which the property is bound or deleting the binding altogether.

In an additional or alternative example, a non-literal value of an object may be computed by being bound to a template associated with the object having the property value. A template may set a default value source, which may allow the properties of a template to be inherited by object properties, such as in cascading styles. In this manner, changing a value in a template may cascade the display changes through one or more objects bound to the template. A template binding is a default value source rather than a literal default value of a property. A default value is most likely a literal value, whereas a default source may be an indirection, the value in some other field. In this manner, a user may set up a binding to a binding. In some cases, a property value may default to a parent value, e.g., a background color may default to a parent's default color. If the parent value is not set explicitly (e.g., does not have a literal value), defaults to the parent's non-literal value which is computed from one or more sources.

A binding to a template of a property may be set or indicated in any suitable manner and using any suitable protocol. In one example, a value of a fill property of an object may be bound using a statement of Fill="{TemplateBinding Background}" which sets the fill property of the object to the background color, pattern, and/or texture of the background property of the template. The template binding of the property value may be edited by changing the template binding to which the property is bound or deleting the binding altogether. In some cases, the property value, e.g., color, can be changed by editing the parent's or some ancestor's background property.

In an additional or alternative example, a non-literal value of an object may be calculated through a system resource reference. A system resource reference may be a reference to a resource of the operating system of the computing device running the editing application or which will be running the application being generated by the editing application. In this manner, the user interface editing application may determine a dynamic value of the indicated system resource and convert the system resource reference value to a property value for the object. A system resource reference may be created in any suitable manner and with any suitable protocol. In one example, a value of a fill property of an object may be set using a statement of Fill="{DynamicResource SystemColors.ActiveBorderBrushKey}". The system resource reference may be edited by changing the reference to which the property is bound or deleting the reference altogether.

In an additional or alternative example, a non-literal value of an object may be calculated through a static resource reference. The static resource reference is similar to a binding, however, the default values used in the computation of the property value may be provided by developer programming rather than an object. A resource reference may be made to another resource such as other products available through the computing device running the editing application or which will be running the application being generated by the editing application, from a resource library, and the like. A resource reference may be created in any suitable manner and with any suitable protocol. In one example, a value of a fill property of an object may be set using a statement of Fill="{StaticResource FavoriteBrush}". The resource reference may be edited by changing the reference to which the property is bound or deleting the reference altogether.

In another example, a non-literal value may be computed from an animation or story board. A storyboard is a collection of animations that are intended to be played as a sequence which may be a set of keyframes at particular points in time. As the animation changes, the property value may dynamically change as well over time. For example, if the user 'seeked' to some interstitial time between key frames, the property still has a value as of that 'seeked' time and that value is computed in any suitable manner, such as through interpolation of the surrounding values as a function of the time-fraction the current time represents in that interval. Animations may not be stored in the property. In some cases, when a user edits a property to be displayed as a part of an animation, the editing application may be translating the property value indications from the user to an associated set of structures associated with the animation. This is on contrast to expressions, which may be stored in the property value in non literal form, and literal values which are stored in the property value in literal form.

In another example, a non-literal value may be calculated from a style setter. A computation from a style setter may be indicated in any suitable manner. In one example, a computation from a style setter may be indicated with a statement such as:

```
<Style x:Key = "MyStyle" Target Type = "{x:Type Rectangle}">
  <Setter Property = "Width" Value = "100"/>
</Style>
...
<Rectangle Style = "{Static Resource MyStyle}"/>
``` which may set the width of a rectangle according to the style of MyStyle. In this manner, a property value may be inherited, although it is to be appreciated that any other suitable method or technique may be used to inherit property values. The style setter may be over ridden in any suitable manner, such as by setting the property value to a literal value.

In another example, a non-literal value may be calculated by a logical parent. For example, the user interface editing software may select a logical parent property and automatically bind the property to the parent. For example, the width of a button may be logically inherited from a grid width or a previous button width. In this manner, a property value may be inherited, although as noted above, there are various suitable ways of inheriting values within a property value. A computation from a logical parent may be indicated in any suitable manner. In one example, a computation from a logical parent may be indicated by a statement such as:

<Grid><Rectangle/></Grid> which may set the width of the rectangle to the value as assigned by the property Grid.Width. The width of the property, such as the width of the rectangle in the above example, may be assigned a literal or non-literal value; however, in some cases, the computed value of the property may be different than the assigned value.

In another example, a non-literal value may be calculated from a property trigger. A property trigger is a detection of some change in state that can play a storyboard and also change some other property values. For example, if the developer wished a display of a button to be gradually brighter when the cursor hovered over the button, and also change the button text to "Now". The developer may crate a storyboard that shows how to make the button brighter (which may modify several properties of several objects of the button). In response to the property trigger for "IsMouseOver=True", then the storyboard for the button brighter display may be played and the button text set to "Now". The button state would return to its default or determined current state if the property trigger value becomes "IsMouseOver=False."

Allowing a property value to be calculated from one or more sources may enrich the user's generation of an application or allow a user to manipulate an application as desired. However, a user of the editing application may want to edit the calculation of the property value and/or set the property value to a literal value. In this manner, the editing application may provide conventional editing controls to allow the user to edit the literal value of a property. The editing application, also having rich semantics, such as non-literal property values, may also provide one or more editing controls to create and/or edit non-literal property values. To reduce the learning curve of manipulation of literal property values and non-literal property values within the same application environment, the conventional editing controls of the editing application may be modified to incorporate editing of non-literal values of properties without substantially changing the user interface experience in the editing application.

To expand the functionality of conventional user interface editing controls which allow literal value modification to also allow non-literal value editing, the conventional user interface controls and/or the object associated with the property may be modified. For example, the user interface display of the editing application conventionally displays a property indication (e.g., fill, width, font size, and the like) with its associated property value (e.g., color indication such as 'red' or an indicator such as a palette displaying the color of red, width value in inches such as 1.25, font size value of 12, and the like). The property indication and/or property value may be displayed with an associated conventional editing control to allow a user to edit the literal value of the property value. Many suitable editing controls are used in current editing applications, as noted above, including text boxes, list boxes, combo boxes, radio buttons, object adorners, grids, sliders, palettes, drop down boxes, and the like. To indicate that a property value has a literal value, the conventional display of the value of the property may be as expected by the user (e.g., a value indicated in a text box or indication of a position on a color wheel, and the like).

To indicate that the value of the property currently is a non-literal value, the conventional display of the property indicator and/or property value may display the property indicator and/or current value of the property (e.g., red, 1.25, or 12) but may also include a non-literal cue which indicates to the user that the current value of the property is non-literal or computed from one or more sources. The non-literal cue may be any suitable cue to the user to indicate that the property value is computed from one or more resources. For example, the non-literal cue may be audible, visual, and the like. An example audible non-literal cue may include one or more of a voice informing the user that the associated property value is a non-literal value, an audible beep or other signal indicating a non-literal value, and the like. An example visual non-literal cue may include one or more of a highlighted background, fill, border, and the like of the property indicator that is different from the background, fill, border and the like color of the property indicators that are associated with literal values. In another example, a visual non-literal cue may include displaying an object having non-literal property values with highlighted and/or shaped object adorners which are different from the object adorners of objects having literal property values. In another example, a tool tip may be displayed indicating through appearance that the property value is a non-literal value. For example, the speed of appearance of a tool tip associated with the property indicator and/or property value may indicate that the associated property value is literal or non-literal. For example, a default delay time may indicate that the value is a default or literal value, and an immediate display of a tool tip may indicate that the value is non-literal. In another example, the tool tip may have a default conventional background, fill, border, and the like color or pattern indicating a default or literal property value and a highlighted (and different) background, fill, border, and the like color and/or pattern for a non-literal value. In another example, the tool tip content (e.g., text) may inform the user that the property value is a non-literal value. It is to be appreciated that the above examples are non-inclusive, and that any display property of the property indicator editor control, the displayed property indicator, and/or displayed property value may be modified to be different from the default used in a conventional display of the property indicator, property indicator editor control, and/or property value. The display of the property value may display to the user the current calculated value of the property value and/or may display the calculation or source of the calculated value. However, it is to be appreciated that the non-literal cue does not include only a display of the means for calculating the non-literal value.

Presentation of the non-literal cue may occur when the object having non-literal values is displayed to be edited, when property indicators that may be edited are invoked and/or displayed to the user, when property values are displayed to the user, and the like. The presentation of the non-literal cue may be automatic, e.g., when the object is displayed, when the property indicators are displayed, and/or when the property values are displayed. In an alternative or additional example, the non-literal indicator may be presented when the user makes a request for indication of non-literal values. The request for non-literal value indication may include one or more of rolling the cursor over the displayed object, property indicator, and/or property value; right-clicking the displayed object, property indicator, and/or property value; pressing a predetermined keyboard key combination to present the non-literal cues, selecting a non-literal display icon, invoking a display mode toggle and the like.

The display of a non-literal property value or object to the user may indicate the calculated value of property. The non-literal cue may indicate to the user that the displayed value or object is based on a calculation from one or more resources, i.e., is a non-literal value. In some cases, the user may access the expressions, instructions, statements, or other indications describing the basis of the calculations used in calculating the non-literal value. For example, the user may be able to select a display toggle button which may convert the display of the current calculated, non-literal property value (e.g., "The Grapes of Wrath") to one illustrating the basis of the calculation (e.g., Text="{Binding Path=BookTitle}"). In another example, the user may roll over or select the displayed object or non-literal value to activate a tool tip or editing control box which describes or indicates the basis of the calculations.

Figure 2:
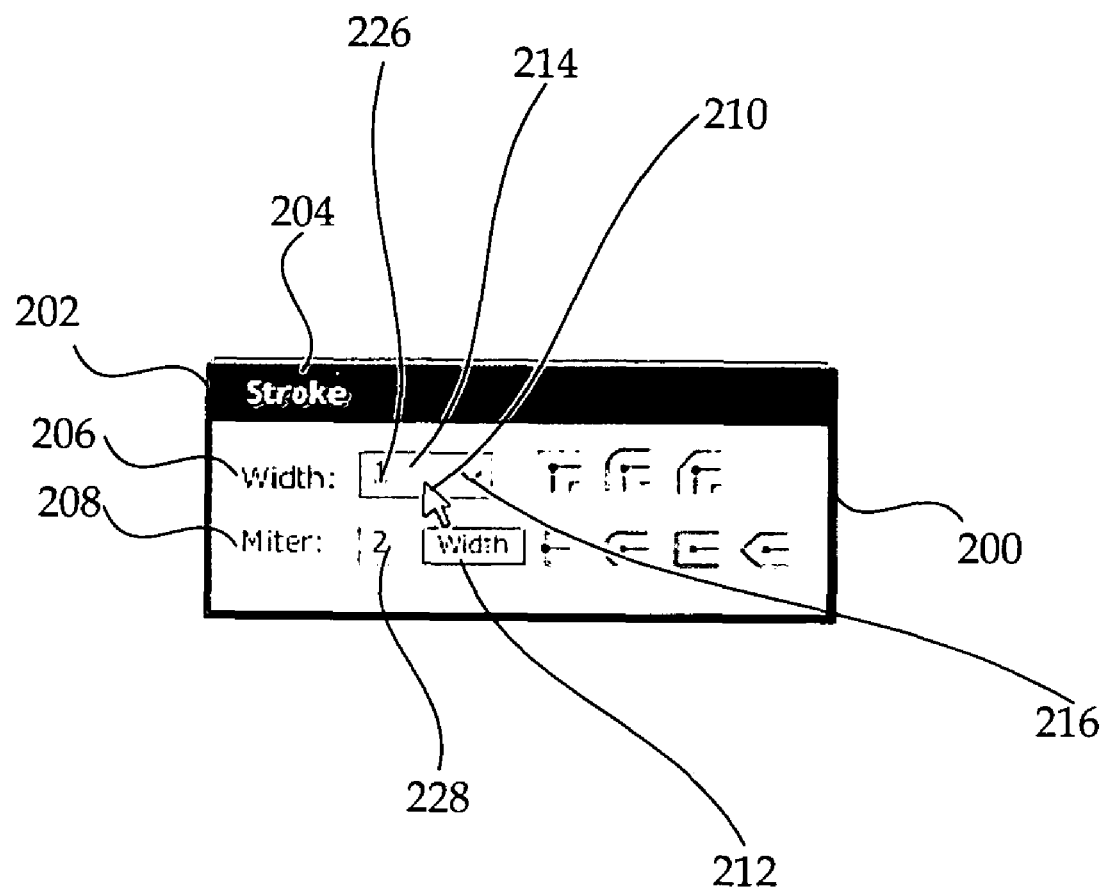
FIG. 2 illustrates an example user interface of an editing application displaying a literal property value.
Figure 3:
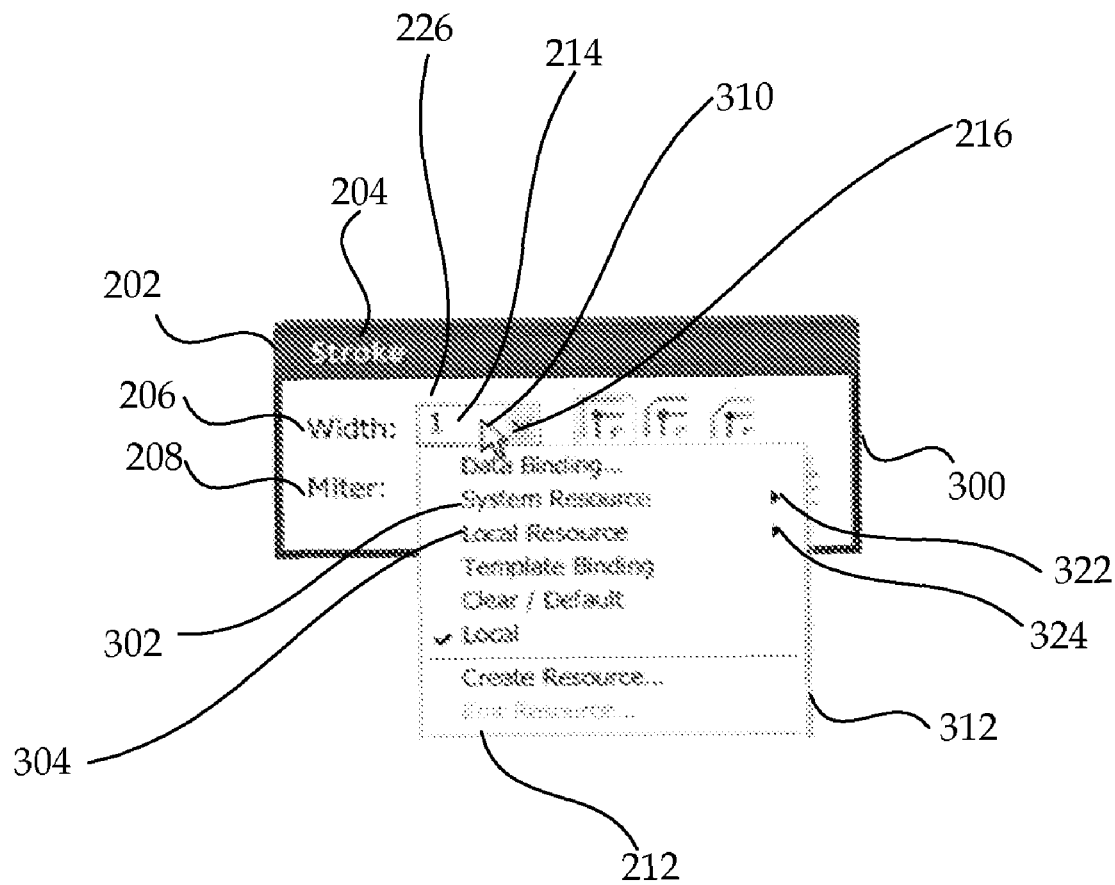
FIG. 3 illustrates the example user interface of FIG. 2 with an interaction with the displayed property value.
Figure 4:
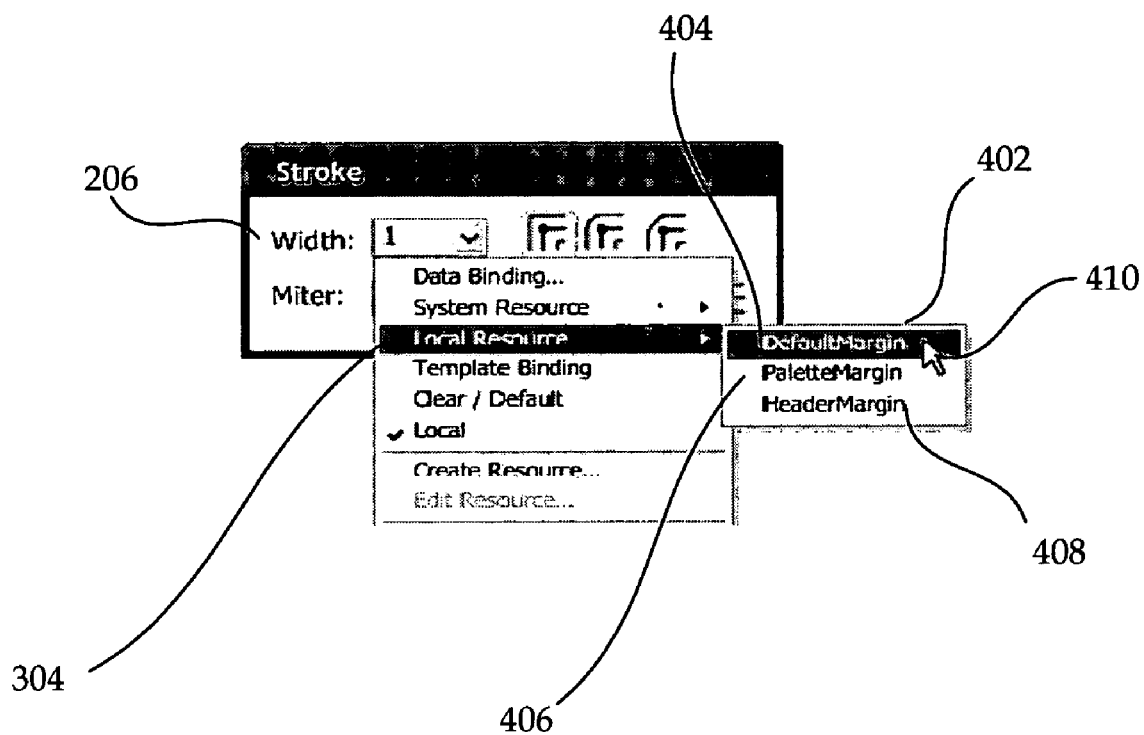
FIG. 4 illustrates the example user interface of FIG. 3 with an interaction to modify the literal property value to a non-literal property value.

FIGS. 2-4 illustrate one example of how additional non-literal property values may be accessed in the context of a combo box. The combo box 200 of FIG. 2 includes a title bar 202 indicating the object property 204 of 'Stroke' which is associated, in this example, with two property indicators, Width 206 and Miter 208. The property value 226 has a literal value of 1 and is associated with the property indicator 206 of width. Likewise, the property value 228 has a literal value of 2 and is associated with the property indicator 208 of miter. The user may roll the cursor 210 over the property value, such as property value 226 and the tool tip 212 may appear indicating that the value is associated with the property indicator of 'width'.

To edit the literal value of the width property value, the user may use conventional methods. For example, the user may type in a new width in the text box and/or may left-click the arrow 216 associated with the text box 214 to display a drop down menu of predetermined literal values for the width.

To edit the property value to a non-literal value, additional gestures and/or commands may be used while retaining the conventional editing gestures of the literal values. For example, the list box accessible by the arrow 216 may include not only selectable literal values for the width, but may also provide an option to edit the value to a non-literal value which may invoke a property editor to facilitate generation of a non-literal value.

FIG. 3 illustrates another example of invocation of a property manager or property editor 300 to edit the current literal value to a non-literal value. In this example, the user may right click the displayed current property value 214 and/or the property indicator 206 to access a list box 312 listing one or more calculations which may be used as a basis for generating a non-literal value. One or more of the displayed calculation options may have further drop down boxes (or further editor controls) of additional options to facilitate generating the basis of the calculation for the non-literal value. For example, as shown in FIG. 3, the options of System Resource 302 and Local Resource 304 have associated arrows 322, 234 respectively for drop down boxes of further options. As shown in FIG. 4, the user may move the cursor 410 to highlight the option Local Resource 304 to illustrate the drop down box 402 with additional options.

Any suitable additional options may be displayed in the drop down box (or other editor control), such as potential local sources for the property value the property indicator. As shown in FIG. 4, the potential sources for the property value of the width property indicator 206 may include DefaultMargin 404, PaletteMargin 406, and HeaderMargin 408. The user may select the Default Margin local resource by moving the cursor 410 to highlight the desired option, as shown in FIG. 4. In response to the selection of the local resource indicator in the box 402 (e.g., DefaultMargin 404), the editing application may modify the value 226 of the width property 206 to be a non-literal value to be calculated from the appropriate local resource, such as by creating the appropriate command(s) to calculate the indicated property value from the indicated resource reference (e.g., Width={StaticResource DefaultMargin), or using any other suitable method or protocol. In this manner, the principle of not interfering with the conventional semantics and/or use of an editing control of a property value is illustrated while allowing a user to override any existing value with a non-literal value.

Figure 5:
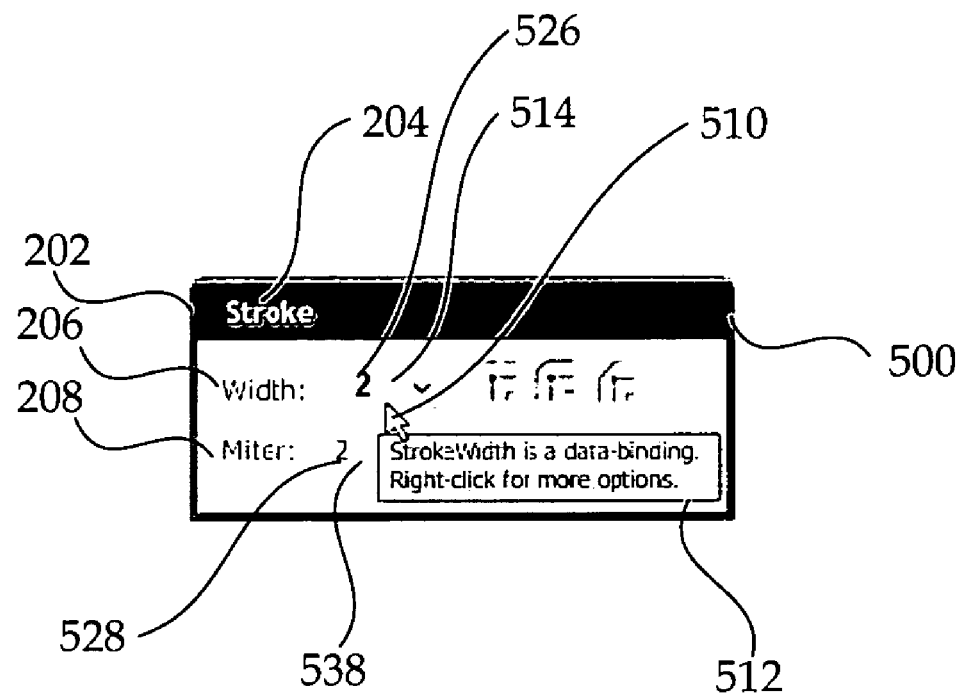
FIG. 5 illustrates an example user interface of an editing application displaying a non-literal property value and a non-literal cue.
Figure 6:
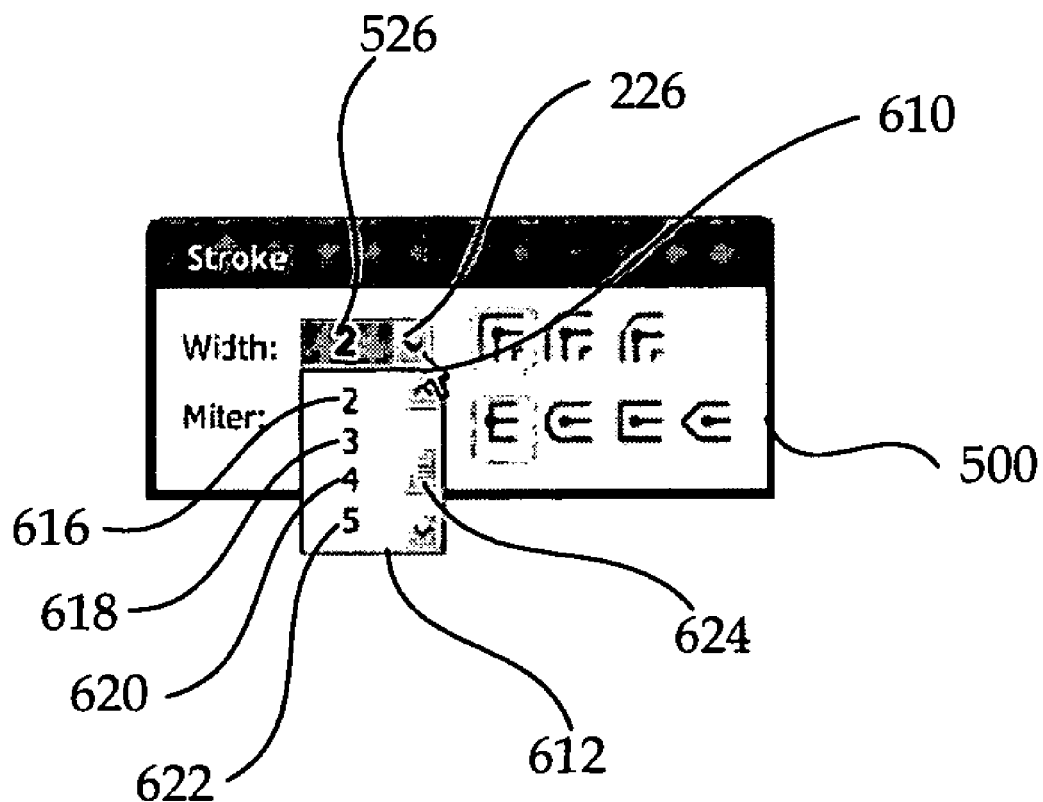
FIG. 6 illustrates the example user interface of FIG. 5 with an interaction with the displayed property value.
Figure 7:
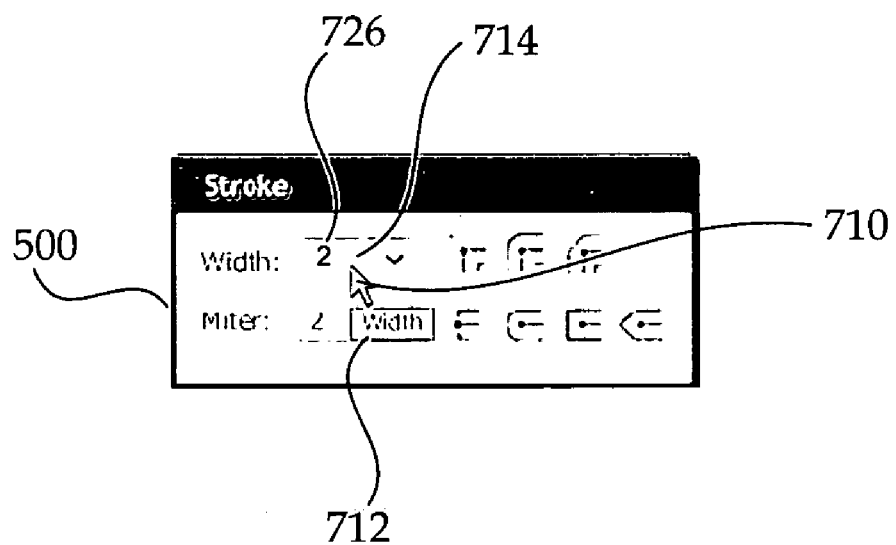
FIG. 7 illustrates the example user interface of FIG. 6 displaying a literal property value.

In some cases, the current value of a property value may be non-literal, which may be converted back to a literal value. FIGS. 5-7 illustrate one example of how a non-literal value is indicated with a non-literal cue and how the non-literal value may be modified to a literal property value in the context of a combo box. The combo box 500 of FIG. 5 includes a title bar 202 indicating the object property 204 of 'Stroke' which is associated, in this example, with two property indicators, Width 206 and Miter 208. The property value 526 has a non-literal value of 2 and is associated with the property indicator 206 of width. The visual cue indicating that the property value of the width property indicator, in this example, is a highlighted background 536 in the displayed current value 526 of the property width 206. In contrast, the property value 228 has a literal value of 2, associated with the property indicator 208 of miter, which is indicated by the default or conventional background 538 which indicates that the displayed property value is a literal value. It is to be appreciated that any other suitable non-literal cue may be used to differentiate the display of a literal and non-literal value.

The user may interact with the non-literal cue, the displayed property indicator, the displayed property value, the displayed editing control, and the like to access further editing controls, options, and/or information associated with the non-literal value. For example, the user may roll the cursor 510 over a non-literal property value, such as property value 526, and the tool tip 512 of FIG. 5 may appear indicating that the displayed value is non-literal, may indicate the type of calculation used to determine the value (e.g., binding, template binding, system resource, system resource, and the like), may indicate the source of the calculation (e.g., the source to which the value is bound, and the like), and/or may indicate instructions to the user to access controls to modify the non-literal value. In the example of FIG. 5, the tool top 512 indicates the that property value 526 of the width 206 is of the type of data-binding and indicates that the user should right-click the value to access more options regarding the property value. Right clicking the property value may access any suitable options and/or property editor, such as that described above with reference to FIGS. 2-4.

The user may use the conventional property editing functions of the combo box 500 in any suitable manner. For example, the user may type a literal value into the text box 514 containing the displayed width property value 526. FIG. 6 illustrates another example of invoking the conventional property editing functions of the combo box 500 of FIG. 5. For example the user may move the cursor 610 and select the arrow 226 associated with the width property value 526. In response, the editing application may display the drop down box 612 listing the predetermined literal values 614, 616, 618, 620, 622) for the width property value 526. Additional options may be displayed by maneuvering the elevator 624 of the drop down menu 612. In one example, the user may move the cursor 610 to select the literal value of two (option 616). In response to the user's selection of the literal value selection in the menu 612, the editing application may set the width property value to the selected literal value, overriding the prior, non-literal value, which had a computed value of two.

In response to the conversion to a literal value, the editing application may also remove the non-literal cue to indicate that the property value is now a literal value, rather than a non-literal value. As shown in the example combo box 500 of FIG. 7, the literal value 726 of two now has a default or conventional background 714, indicating that the value is literal, and no longer computed. If the user rolls the curser 710 over the width property value 726, the tool tip 712 may be displayed. As discussed above with reference to FIG. 2, the tool tip for a literal value may indicate how to invoke non-literal value editors, the property indicator, and the like. As shown in FIG. 7, the tool tip 712 indicates that the associated width property value 226 is the width, which is in contrast to the tool tip window 512 of FIG. 5 which indicated that the width property value was a non-literal value based on a data binding. In this manner, the principle of not interfering with the conventional semantics and/or use of an editing control of a property value is illustrated while allowing a user to override any existing value with a literal value.

Figure 8:
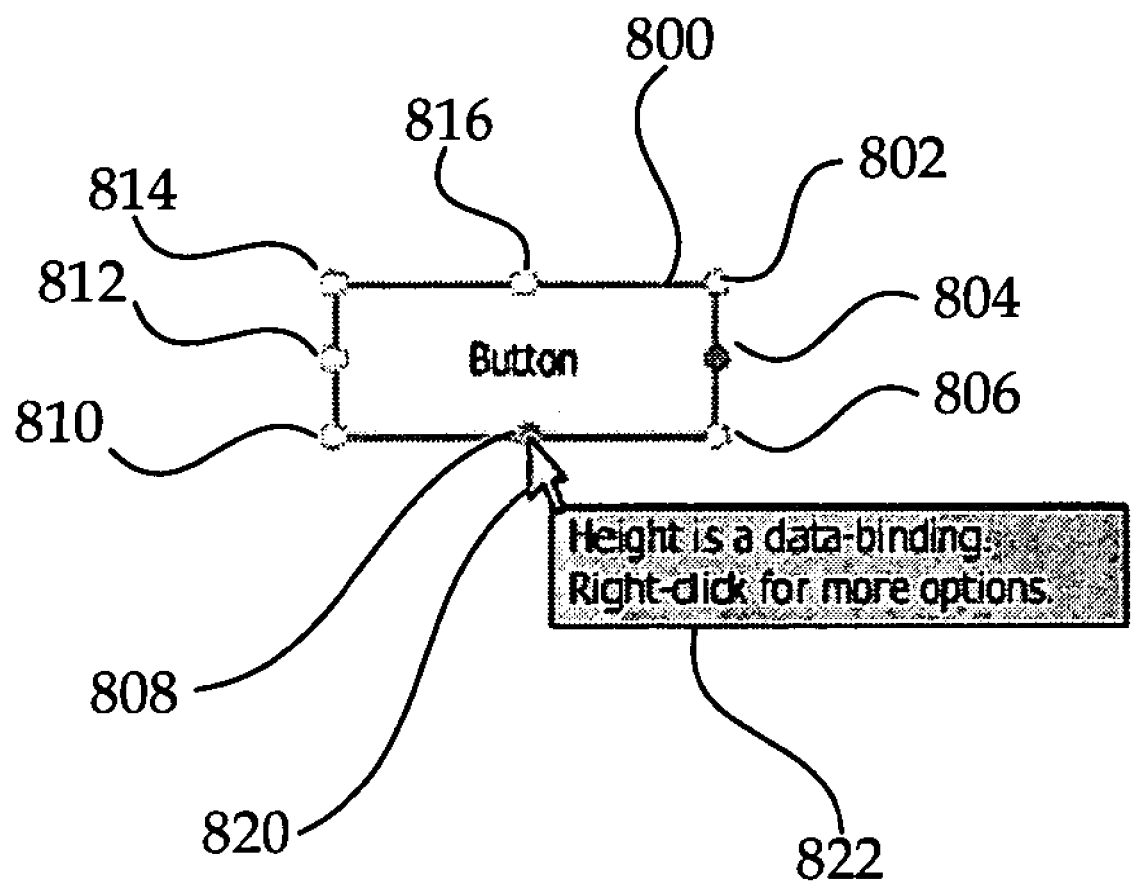
FIG. 8 illustrates an example display of an object having a non-literal property value and an associated non-literal cue.

In another example, the non-literal cue may be additionally or alternatively associated with the display of the object itself. FIG. 8 illustrates an example of a non-literal clue with a displayed object, a button 800. Display of a button of other object in an application developing application or graphics application may include one or more adorners. Adorners are conventionally displayed at the periphery and vertices of the displayed object, although in some cases, such as in 3 dimensional object editing, the adorners may be 'within' the displayed object. As shown in FIG. 8, the button 800 has eight adorners 802, 804, 808, 806, 810, 812, 814, 816, one at each corner and side of the button. In a conventional user interface, one or more adorners of a displayed object may be manipulated (e.g., by left-clicking and dragging the adorner) to change the size and/or orientation of the displayed object. In a conventional user interface, the adorners have the same shape, fill and border colors, and orientation as other adorners on the same object and/or other displayed objects. As shown in the FIG. 8, the conventional adorners are illustrated as black line circles with a while fill color. However, to indicate to the user that one or more property values of the object are non-literal values rather than literal values (e.g., the non-literal cue), one or more adorners may have a highlighted boundary color, highlighted fill color, a highlighted background color, a different shape, a thicker or thinner line width, an animation (e.g., blinking), an edge glow, a different pattern, and the like. In the example of FIG. 8, adorners 804 and 808 have a fill color different from the conventional adorners.

Figure 10:
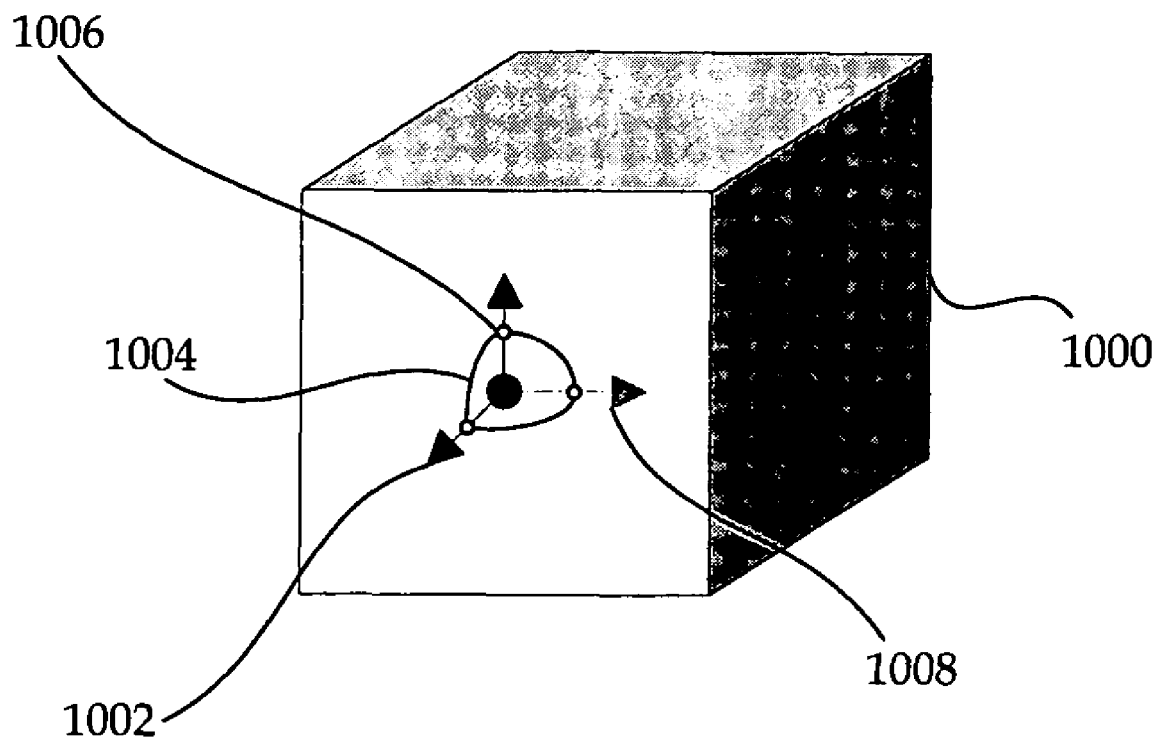
FIG. 10 illustrates an example display of a 3-dimensional object having adorners.
Figure 11:
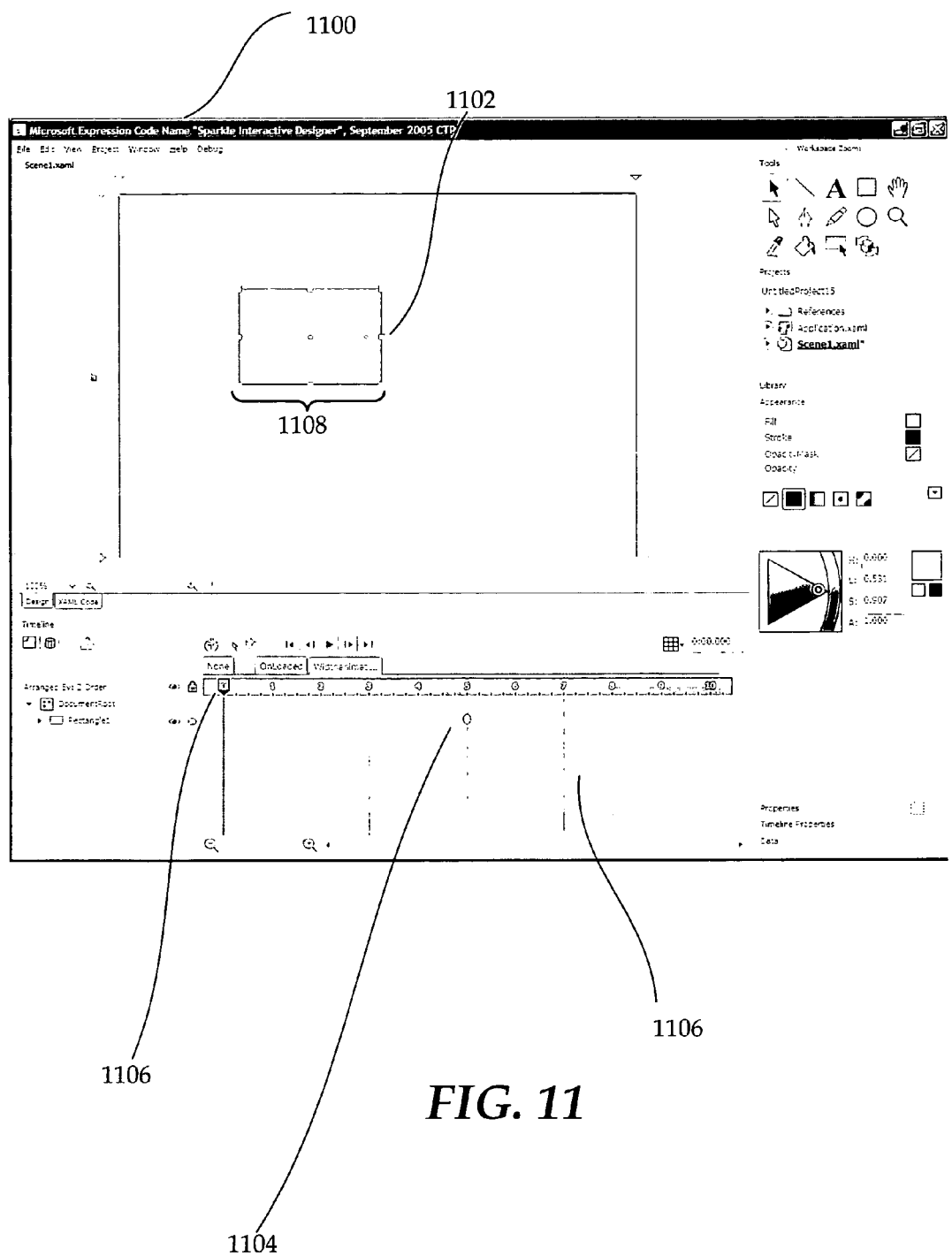
FIG. 11 illustrates an example display at a start time of an animation of an object.

FIG. 10 illustrates example adorners or control portions for a 3-dimensional object that are conventionally depicted within the object body. In FIG. 10, the displayed object is a cube 1000 and has various arrows or axes such as axis 1002, arcs such as arc 1004, and node such as node 1006. In a manner similar to that described above with reference to FIG. 8, any one or more of the adorners of the cube 1000 may be modified to include or display a non-literal cue. For example, any one or more of the arcs, axis arrows, and/or nodes may have associated tool tips, highlighting, fill, patterns, line thickness, and the like to indicate that the associated property value of the object has a non-literal value. In the example of FIG. 10, the axis arrow 1008 has a line color which is slightly lighter than the conventional axis arrows, such as arrow 1002.

The modified adorners of the object may be positioned to indicate a particular property value having a non-literal value. More particularly, a predetermined adorner of an object may be associated with a property indicator. If the predetermined adorner includes a non-literal cue, then the user may be informed that the associated property indicator has a calculated, non-literal value. In the example of FIG. 8, the adorner 804 at the right side of the button may indicate that the width of the button is a non-literal value since the adorner 804 may be manipulated by the user to change the width of the button. Similarly, the adorner 808 at the bottom side of the button 800 may indicate that the height of the button is a non-literal value since the adorner 808 may be manipulated by the user to change the height of the button. It is to be appreciated that any adorner may be associated with any suitable property indicator and property value, such as the adorner 804 may indicate the height of the button is a non-literal value since it is located on the side of the button having the value of the height property.

The non-literal cue may allow a user to access conventional editing of property values. For example, with reference to FIG. 8, a user may override a non-literal value of the width by manipulating the adorner 804 to a new width. In this manner, the non-literal value may be replaced with the literal value set from the displayed width of the button after manipulation of the adorner 804. In response to overriding a non-literal value with a literal value, the editing application may remove the non-literal cue from the associated adorner, e.g., convert the fill color of the adorner to the value.

The non-literal cue associated with the object (such as the adorners) may allow a user to access editing controls or other information associated with the non-literal value. As noted above with respect to the combo box examples of FIG. 2-7, access to the controls and/or information regarding the non-literal value of the property may be invoked in any suitable manner. In the example of FIG. 8, the user may move the cursor 820 over an adorner associated with the displayed object. If the adorner does not include the non-literal cue (e.g. is not highlighted, such as adorner 814), the user may be presented with conventional editing functions, such as tool tips to modify the size of the button, information regarding the property value (e.g., the property value of the height of the button, left clicking to select the adorner and/or object, and the like. If the adorner does include the non-literal cue, information and/or additional functionality to access the non-literal controls may be presented. As shown in the example if FIG. 8, moving the cursor 820 over the adorner 808 which includes the non-literal cue of the highlighted fill color may present the user with a tool tip box 822. The tool tip box may indicate the property indicator associated with the selected adorner, that the associated property value is non-literal value, the type of calculation used to determine the value (e.g., binding, template binding, system resource, system resource, and the like), the source of the calculation (e.g., the source to which the value is bound, and the like), and/or instructions to the user to access controls to modify the value to a literal and/or non-literal value. In the example of FIG. 8, the tool tip 822 indicates the that property indicator associated with the adorner 808 is the height of the button, indicates the type of calculation used to compute the non-literal value of the height is a data-binding, and indicates that the user should right-click the adorner to access more options. Right clicking the adorner, or any other displayed non-literal cue, may access any suitable options and/or property editor, such as that described above with reference to FIGS. 2-7.

Figure 9:
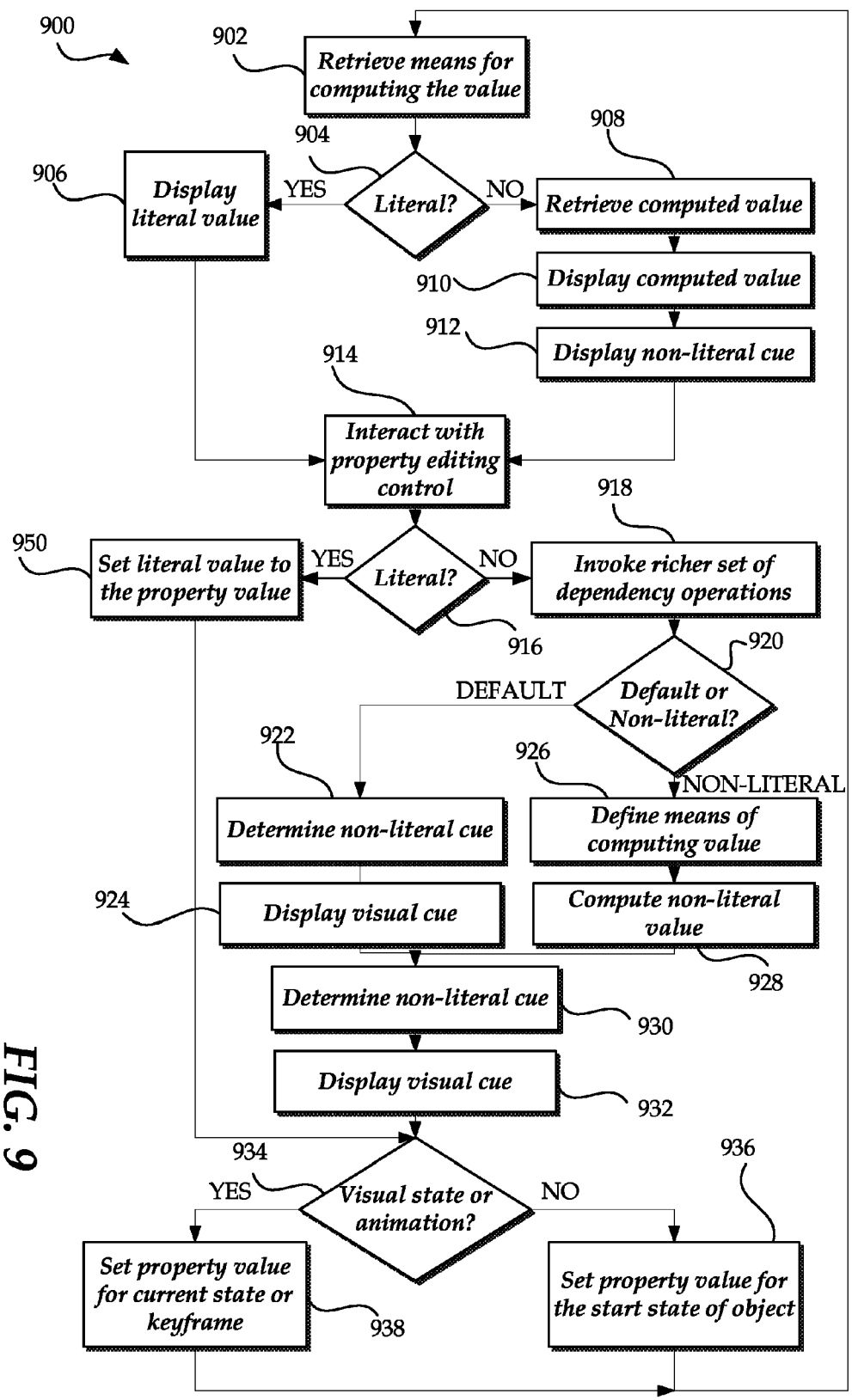
FIG. 9 illustrates an example method for presenting literal and non-literal property values to a user in the context of an editing application.

FIG. 9 illustrates an example method 900 of presenting literal and non-literal property values to a user in the context of an editing application. To prepare to display a property value and/or an object having a property value, the means for computing the property value may be retrieved 902. For example, a literal value or the instructions for calculating a non-literal value may be retrieved from memory which is associated with the property indicator. If the value is determined to be a literal property value 904, the literal value may be displayed 906. The literal value may be displayed in any conventional manner. If the value is non-literal, the computed value may be retrieved 908. The non-literal value may be retrieved in any suitable manner. For example, the non-literal value may be retrieved from a memory location associated with the property indicator and/or calculated using the retrieved instructions for computing the value. The non-literal value may be displayed 910 in any suitable manner. For example, the current value of the non-literal value may be displayed in a manner similar to a literal value of the property value, e.g., such as in a user interface property editing control which may include a combo box, text box, palette; incorporated into a displayed object; and the like. The display of the non-literal value may also be displayed 912 with a non-literal cue indicating a non-literal value. As noted above, the non-literal cue may include one or more of an audio message, an icon, a highlighted color, a different shape, a different pattern, a different border, and the like. The non-literal cue may be associated with the display of the current value of the displayed property value. The display may additionally include an indication of the means of computation used to compute the non-literal value. As noted above, the means of computation may include a tool tip indicating the type of computation (e.g., binding, resource reference, etc.), an indication of the instructions or expression used to calculate the current property value (e.g., Text={Binding Path=BookTitle}, etc.), and the like.

The user may interact 914 with a property editing control for the displayed property value to change the value of the property value. As noted above, the interaction with the property value may be through a displayed user interface (e.g., combo box, palette, and the like), by manipulating a displayed object having the associated property value, providing instructions to set the property value, and the like. If the new value is determined 916 to be a literal value, the interaction with the property editing control may be invoked through the conventional behavior of the user interface control, e.g., typing in a new literal value into a text box, selecting a color from a displayed palette, selecting a literal value from a list box, and the like. The editing application may then associate and/or store 918 the new literal value with the property value associated with the property indicator.

If the new value is determined 920 to be a default value (e.g., a return to default values stored in memory is indicated to be determined), the current value of the property indicator may be cleared 922 (e.g., to a null value). The cleared property value may indicate to the editing application to calculate 924 the property value from the default value or by context.

If the new value is determined 916 to be a non-literal value, a richer set of dependency property operations may be invoked 918 in any suitable manner. For example, as noted above, the manipulation of a property value to a non-literal value may be through an additional editor control associated with the conventional editing control, e.g., right clicking a combo box to access additional controls, clicking an icon associated with the property value, and the like. As noted above, a tool tip may indicate the means for invoking the non-literal value property editing controls.

If the new value is determined 920 to be a non-literal value, the means of computing the value may be defined 926. For example, as noted above, the type of calculation of a non-literal value may include one or more of a data binding, a resource reference, a system resource reference, a template binding, a computation from a style setter, a computation from a logical parent, a computation from a story board, a computation from a property trigger, and the like. In response to manipulation of the editing controls of a non-literal value, the editing application may generate the appropriate instructions, statements, indications, and/or expressions to calculate the non-literal value and the appropriate resources providing information to the calculation. The non-literal value may be computed 928 using the determined means of computing the value, e.g., accessing the indicated resources and by processing the instructions, statements or expressions defining the non-literal value calculation.

The editing application may then determine 930 an appropriate non-literal cue. As noted above, the non-literal cue may be any suitable visual, audio indication to the user that a displayed value and/or object includes a non-literal value. The display of the property value (e.g., the editing control) and/or the object may be modified 932 to include the non-visual cue.

The current editing context of the object associated with the property value may be examined 934, whether or not the new value is a literal or non-literal value. If the current editing context of the object is not within a visual state or animation, the current property value may be set 936 for the start or default state of the object. The start state of the object may include the determined literal or non-literal value (either from operation 950 or 928 above) or may be a default value. If determined literal or non-literal property value is not a portion of the start state of the object, the determined property value may be stored in memory associated with the object and associated with a particular state of the object. If the current editing context is within a visual state (e.g., being currently displayed) or in an animation, the value of the property may be set 938 to the determined literal or non-literal value for the current visual state or for the current animation keyframe. If the current state is an animation keyframe, the editing program may insert any appropriate new keyframe and/or compute the appropriate interpolation from a previous state to the newly set property value and/or to a subsequent state from the newly set property value. Inserting a keyframe is discussed further U.S. application Ser. No. 10/825,035 filed Apr. 15, 2005, which is incorporated herein by reference.

Figure 12:
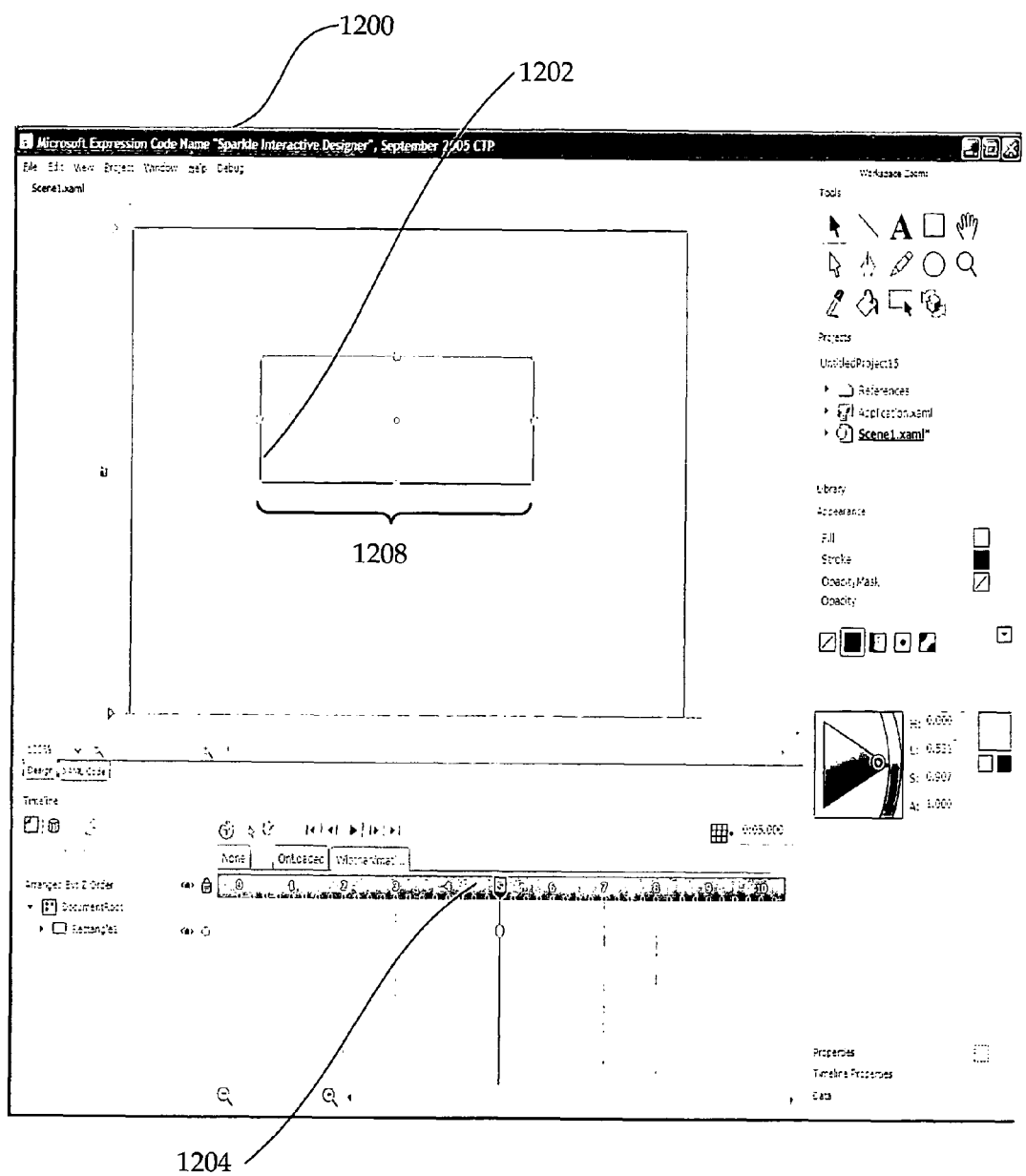
FIG. 12 illustrates an example display of the object of FIG. 11 at an end time.
Figure 13:
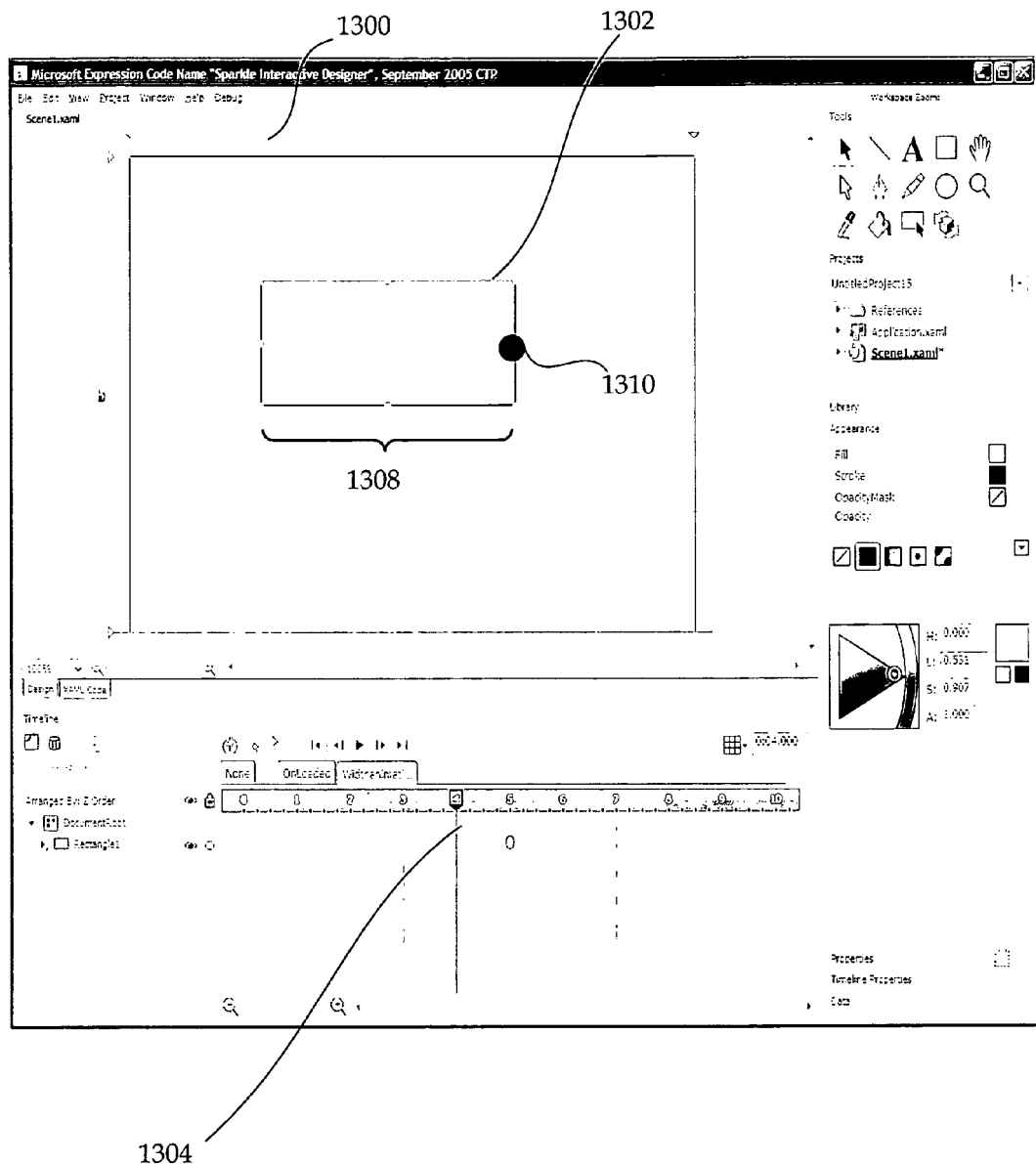
FIG. 13 illustrates an example display of the object of FIG. 11 at an intermediate time.
Figure 14:
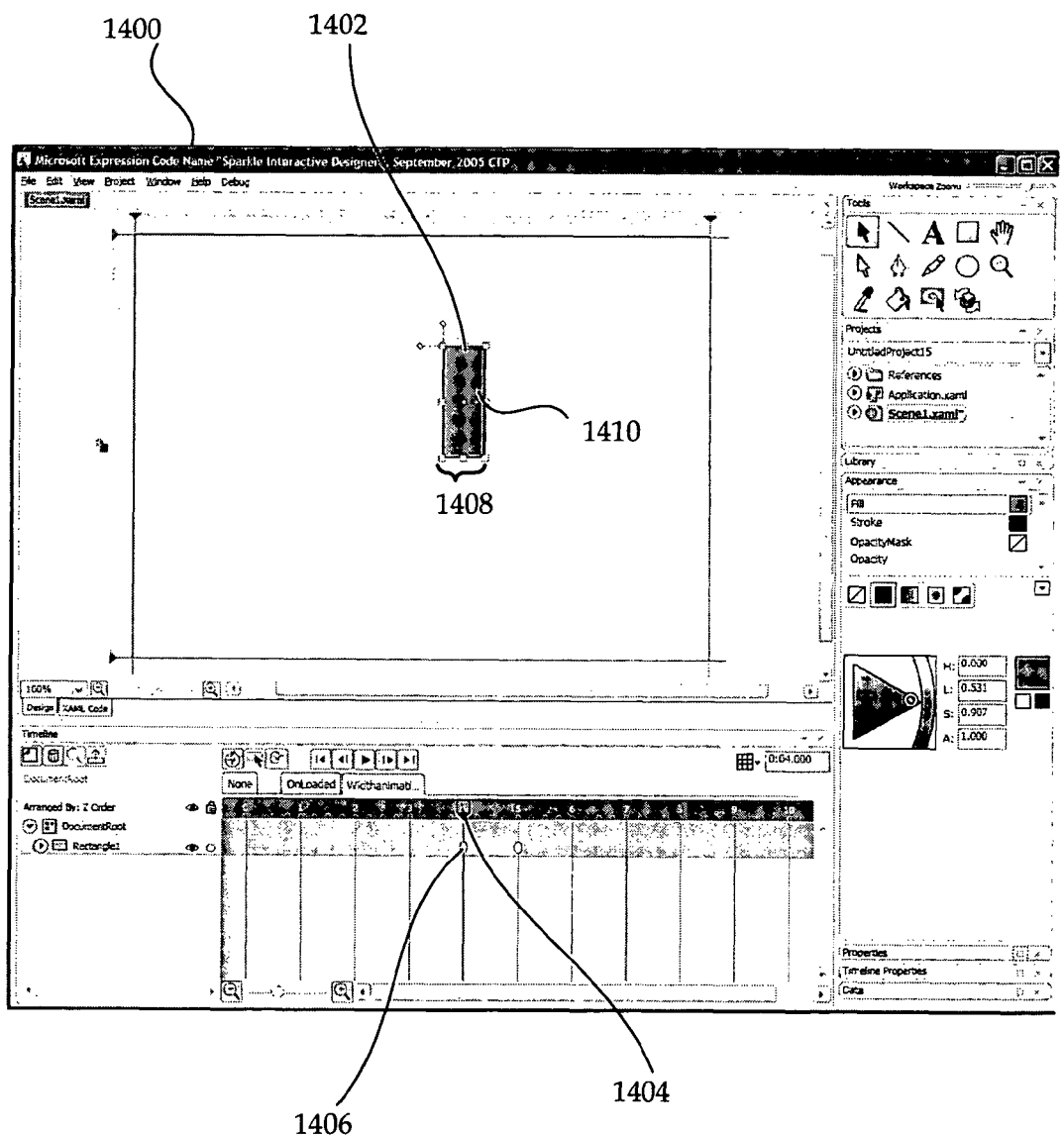
FIG. 14 illustrate an example display of the object at the intermediate time with a modified property value.

FIGS. 11-14 illustrate an example display of editing an animation of an object. In the example if FIG. 11, the display 1100 displays the animated object as a button 1102. As indicated by the animation timeline 1106, the displayed button 1102 has the property values as determined at the start time of zero, as shown by the time indicator 1106. One of the property values of the button is its width 1108. FIG. 12 illustrates a display 1200 displaying the button 1202 at the end time of five seconds as indicated by the timeline indicator 1204. The width 1208 of the button at the end time is slightly larger than the width 1108 of the button at the start time of FIG. 11. FIG. 12 depicts a display 1300 of the button 1302 at an intermediate time of 4 seconds as indicated by the timeline indicator 1304. The width of the button 1308 is determined by interpolation of the time 1304 and the start and stop widths defined by the keyframes at those times. In this manner, the displayed property value of the width of the button 1302 is calculated from one or more resources. The non-literal value of the width of the button may be indicates with a non-literal cue. As shown in the example if FIG. 13, the non-literal cue may be a fill of the adorner of the displayed object, button 1302. While the button is displayed at the intermediate time, the user may override the computed non-literal value of the width and set the property value of the width to another non-literal value or to a literal value. For example, FIG. 14 illustrates a display 1400 where the user has manipulated the adorner 1310 of FIG. 13 to the new location 1410 of the button 1402. The manipulation of the adorner adjusted the property value of the width to a smaller value, which is displayed as the width 1408 of the button 1402. Manipulation of the adorner also converted the computed value of the width to be a literal value, e.g., the width as set by the displayed button 1402. In response to the new property value of the width, the editing application may create a new keyframe, indicated by the keyframe indicator 1406 at the intermediate time 1404 of four seconds. In this manner, the editing application, in response to the user providing a new literal or non-literal value for a property value in an animation, may cause the editing application to insert appropriate keyframes and/or adjust the display of the associated object.

With reference to FIG. 9, to display the newly determined value, the editing application may return to retrieving the means for computing the value 902 and displaying 906 the literal value or displaying the non-literal value 910 as appropriate. In this manner, a standard interaction with editing controls may allow a user to modify a property value in a conventional way while also exposing additional controls or ways to access richer operations allowing a user to modify a property value to be calculated from one or more resources. The display of a non-literal cue may indicate to a user that the object has one or more property values which are non-literal. The non-literal cue may be on a display element of the editing control of the property value and/or on the displayed object. Further instructions and/or information may be accessed by interacting with the visual cue or in a predetermined manner, which does not interfere with conventional use of the editing control and object.

While the preferred embodiment of the invention has been illustrated and described, it will be appreciated that various changes can be made therein without departing from the spirit and scope of the invention. For example, although the above examples describe modifying the property value associated with a display component of an object, it is to be appreciated that a display component, control component, or any other property of an object or resource may be exposed and/or modified using the above-described techniques of allowing both literal and non-literal property values and indicating the status of the property value to a user.

The invention claimed is:

1. A method comprising:
   associating a first literal property value with a property indicator and with a single displayed object, wherein the first literal property value does not depend on a surrounding environment of the first literal property value or on other sources other than a data store storing the literal value;
   receiving a modification of the first literal property value;
   determining that the modification comprises changing the first literal property value to a non-literal property value, wherein the non-literal property value represents a property type comprising an object width and is based at least in part on one or more other property types of an object other than the single displayed object, wherein the one or more other property types are different than the property type and comprise at least one of: a height, a font size, or a fill color of the object other than the single displayed object;
   indicating to a user that the non-literal property value is non-literal with a non-literal cue, wherein the non-literal cue is derived from the single displayed object and not from any other displayed object and is presented with the non-literal property value, and wherein the non-literal cue includes an indication of instructions or an expression for calculating the non-literal property value based on the one or more other property types.

2. The method of claim 1, wherein the non-literal cue includes a visual cue.

3. The method of claim 2, wherein indicating to the user includes modifying a display characteristic of the single displayed object.

4. The method of claim 3, wherein the non-literal cue further includes a displayed appearance of at least one adorner of the single displayed object which is different from a conventional displayed appearance of an adorner of the single displayed object.

5. The method of claim 2, wherein indicating to the user includes modifying a display characteristic of a conventional editing control of the property value.

6. The method of claim 5, further comprising interacting with the non-literal cue to access additional operations associated with the non-literal property value.

7. The method of claim 1, further comprising:
   receiving another modification via an interaction with one or both of the single displayed object or an editing control of the property indicator in a conventional manner;
   determining that the another modification comprises changing the non-literal property value to a second literal property value.

8. The method of claim 1, wherein the non-literal value is computed from at least two sources.

9. A system comprising:
  means for displaying an indication of a property value of a single displayed object, the property value being a non-literal value;
  means for providing a non-literal cue to a user, wherein the non-literal cue is derived from the single displayed object and not from any other displayed object;
  means for calculating the non-literal value from at least one resource value of one or more resources, wherein the non-literal value has a value type different from another value type of the at least one resource value;
  means for modifying the property value in a conventional manner to a literal value wherein the literal value does not depend on its surrounding environment or other sources other than a data store configured to store the literal value; and
  means for toggling a display of the indication of the property value, when the property value is the non-literal value, between a current calculated non-literal property value and an indication of a calculation which would produce the current calculated non-literal property value.

10. The system of claim 9, wherein the non-literal cue includes a visual cue.

11. The method of claim 10, wherein the means for providing the non-literal cue includes means for modifying a display of the single displayed object.

12. The method of claim 11, wherein the non-literal cue includes a displayed appearance of at least one adorner of the single displayed object which is different from a conventional displayed appearance of an adorner of the single displayed object.

13. The method of claim 10, wherein the means for providing the non-literal cue includes means for modifying a display characteristic of a conventional editing control of the property value.

14. The method of claim 13, further comprising means for interacting with the non-literal cue to access additional operations associated with the non-literal value.

15. The method of claim 9, further comprising means for interacting with the single displayed object and/or an editing control of the property value in a conventional manner to change the property value from the non-literal value to the literal value.

16. The method of claim 9, wherein the calculating the non-literal value occurs from at least two sources.

17. One or more computer readable storage media containing computer readable instructions that, when implemented, perform a method comprising:
  displaying a property value, the property value being associated with a property indicator of a single object to be displayed;
  displaying the single object or an editing control of the property value in a conventional manner;
  modifying the property value to be calculated from one or more resources, wherein the property value has a first value type and the one or more resources include a second value type, wherein the first value type is different from the second value type, the property value representing a width of a first object other than the single object, and second value type being a height, a font size or a fill color of a second object other than the single object;
  indicating to a user that the property value is a calculated value with a non-literal cue, wherein the non-literal cue is derived from the single object and not from another object to be displayed; and
  calculating the property value from one or more resources.

18. The one or more computer readable storage media of claim 17, wherein indicating to the user includes modifying a display of the single object and/or the property value to differentiate the display from a conventional display of the single object and/or property value, the method further comprising interacting with the non-literal cue to access additional operations associated with the property value.

* * * * *